(12) United States Patent
Kuroda (10) Patent No.: US 6,528,158 B1
(45) Date of Patent: Mar. 4, 2003

(54) DEVELOPER REGULATING MEMBER AND METHOD OF MOLDING THE SAME

(75) Inventor: Masaaki Kuroda, Ryugasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 09/620,643

(22) Filed: Jul. 20, 2000

(30) Foreign Application Priority Data

Jul. 29, 1999 (JP) ............................................. 11-215890

(51) Int. Cl.⁷ ........................ B32B 15/04; B32B 15/08; G03G 15/095

(52) U.S. Cl. ...................................... 428/332; 399/284

(58) Field of Search ................................. 399/249, 274, 399/284; 428/332

(56) References Cited

U.S. PATENT DOCUMENTS 5,453,224 A    9/1995    Kuroda ........................ 264/427

FOREIGN PATENT DOCUMENTS

| JP | 8-95377 | | 4/1996 |
| JP | 11028727 | * | 2/1999 |

OTHER PUBLICATIONS translation of JP11028727.*

* cited by examiner

Primary Examiner—Stevan A. Resan
Assistant Examiner—Nikolas J Uhlir
(74) Attorney, Agent, or Firm—Fitzpatrick, Cella, Harper & Scinto (57) ABSTRACT

A metal thin plate and thermoplastic elastomer have largely different coefficients of linear expansion. When the thermoplastic elastomer is injected into a mold, in which the metal thin plate is mounted and arranged in advance, to integrally mold an elastic blade, since shrinkage of the thermoplastic elastomer during cooling solidification is much larger than that of the metal thin plate, the thermoplastic elastomer on the metal thin plate is fixed to the metal thin plate, and distortion during molding remains near the gate. Distortion occurs between the metal thin plate and gate in a direction perpendicular to the long side of the elastic blade. This appears as streaking nonuniformity in the coating on a sleeve produced by partial defective urging. A resin flow changes its flowing direction after it abuts against the long side, on the metal thin plate side, of the elastic blade. A flow mark is consequently formed on the surface of the elastic blade. In order to solve these problems, in a developer regulating member obtained by integrally forming a metal thin plate with spring elasticity and an elastic blade by injection molding or injection compression molding, a resin injection gate for the elastic blade is formed on a short-side end face of the elastic blade.

6 Claims, 9 Drawing Sheets

DEVELOPER REGULATING MEMBER AND METHOD OF MOLDING THE SAME

FIELD OF THE INVENTION

The present invention relates to a developing unit in an image forming apparatus such as an electrophotographic copying machine or electrophotographic printer and, more particularly, to a developer regulating member adopted in a one-component developing unit which performs development by using a one-component developer, and a method of molding the same.

BACKGROUND OF THE INVENTION

In a conventional electrophotographic image forming apparatus, an electrostatic latent image formed on an image carrier is made visible as a toner image by a developing unit.

Figure 8:
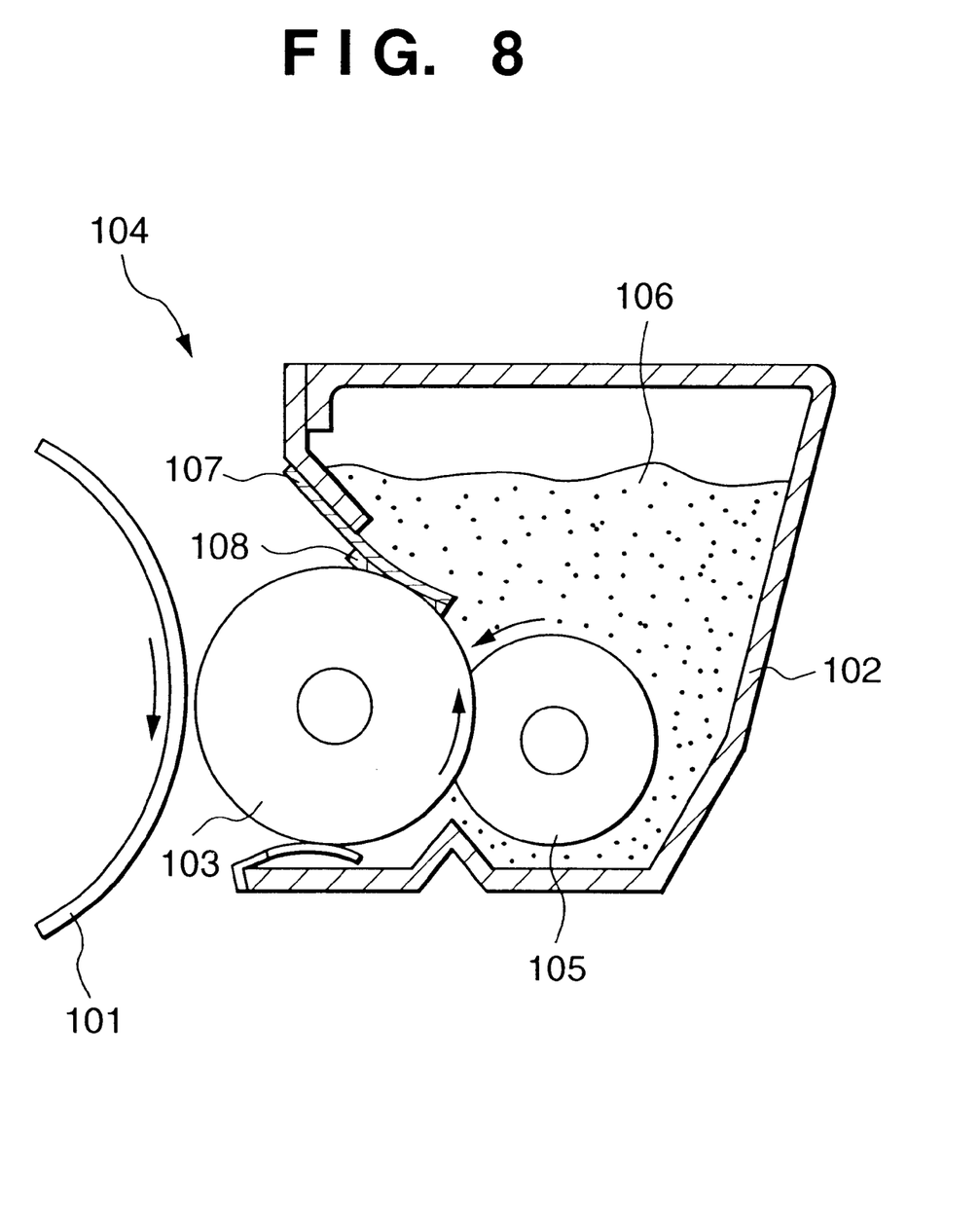
FIG. 8 is a sectional view of a conventional developing unit.

As one such conventional developing unit, for example, a developing apparatus shown in FIG. 8 is known, in which a developer carrying member 103 (to be referred to as a developing sleeve hereinafter) is rotatably attached to a developer container 102 at a small distance from an electrophotographic photosensitive drum 101 rotatably supported by an apparatus main body. A developer regulating member 104 and elastic roller 105 are abutted against the developing sleeve 103. Toner 106 serving as a one-component developer is contained in the developer container 102.

In this conventional developing unit, as a means for regulating small the layer thickness of the toner 106 carried and conveyed to the developing unit by the developing sleeve 103, the developer regulating member 104 made of rubber or a metal is abutted against the developing sleeve 103. The toner 106 is regulated as it is passed through the abutting portion between the developer regulating member 104 and developing sleeve 103, so that a thin film of the toner 106 is formed on the developing sleeve 103. Also, triboelectricity for developing the latent image is applied to the toner 106 by friction at the abutting portion.

To form the thin film coating with the toner 106 on the developing sleeve 103, since the particles of the toner 106 exist with a distribution range of several $\mu m$ to ten-odd $\mu m$, when development is to be performed by using the developer regulating member 104 and developing sleeve 103, the following two factors are particularly important.

First, it is important to urge the developer regulating member 104 against the ridge portion on the surface of the developing sleeve 103 uniformly and highly precisely so that the toner 106 sandwiched between the developing sleeve 103 and developer regulating member 104 is uniformly charged by friction, and simultaneously to form a uniform thin layer on the developing sleeve 103. For this purpose, the developer regulating member 104 must have a high flatness.

Second, it is important not to form a partial streaking nonuniformity in the thin layer on the developing sleeve 103. For this purpose, the developer regulating member 104 which urges against the developing sleeve 103 must have a small surface roughness.

When the developer regulating member 104 is made of a metal, it has a high modulus of elasticity. The urging force accordingly fluctuates largely in accordance with the urging conditions, and a preset pressure is difficult to control. Since the developer regulating member 104 is a rigid body, it is difficult to urge it uniformly along the ridge of the sleeve, and a streaking nonuniformity in the coating and the like tends to be formed on the developing sleeve 103 by partial defective urging.

When the developer regulating member 104 is made of rubber, it has a lower modulus of elasticity than the developer regulating member 104 made of a metal. The urging force accordingly fluctuates less in accordance with the urging conditions, and the preset pressure can be controlled easily. However, since this developer regulating member 104 is soft, it is difficult to set the urging position against the developing sleeve 103. When the developer regulating member 104 is used over a long period of time, creep is produced by plastic deformation in rubber to decrease the preset pressure, affecting the development efficiency.

Figure 9:
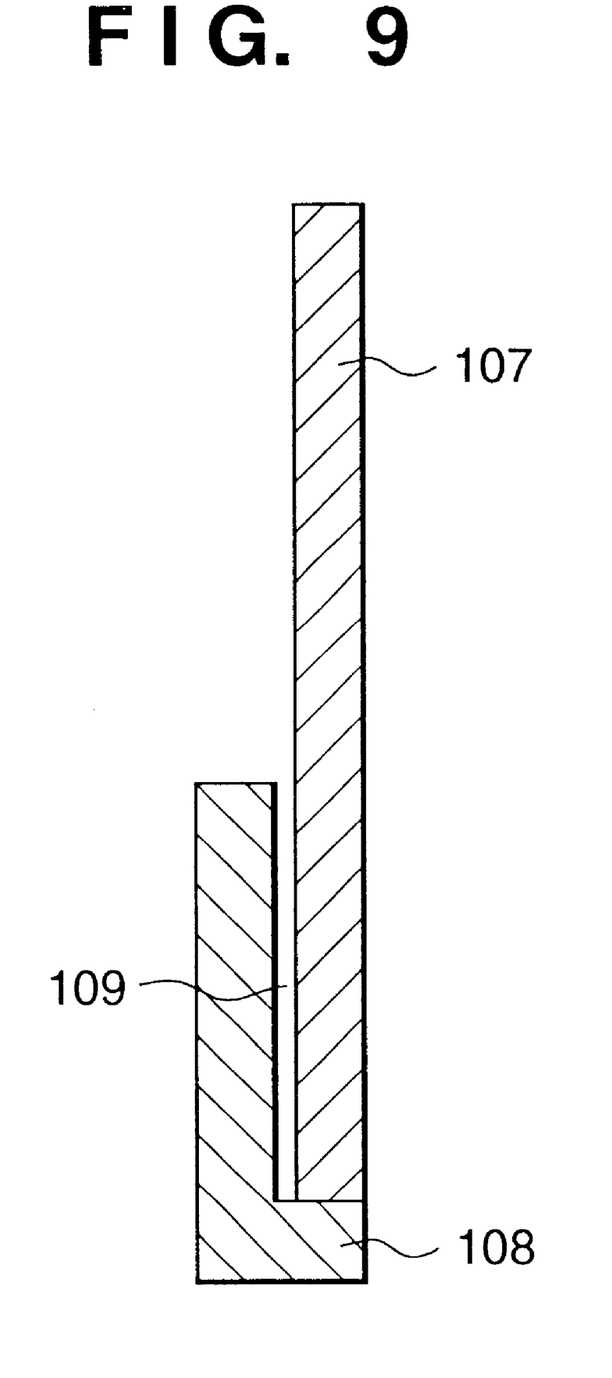
FIG. 9 is a cross-sectional view showing a conventional developer regulating member.

As a countermeasure, as shown in FIG. 9, it is proposed to form a developer regulating member 104 from an elastic blade 107 and metal thin plate 108, and to stack the elastic blade 107 made of rubber or the like on the metal thin plate 108 with an adhesive 109. To stack this developer regulating member 104, the elastic blade 107 molded in advance to form a rubber piece is adhered through the adhesive 109, or the metal thin plate 108 is mounted and arranged in a mold in advance, and raw material rubber is charged into the mold and uniformly and thermally formed with a hot press. In recent years, a method of mounting and arranging a metal thin plate in a mold in advance, and injection-molding a thermoplastic elastomer in the mold is proposed, as described in Japanese Patent Laid-Open No. 8-95377.

Figure 5:
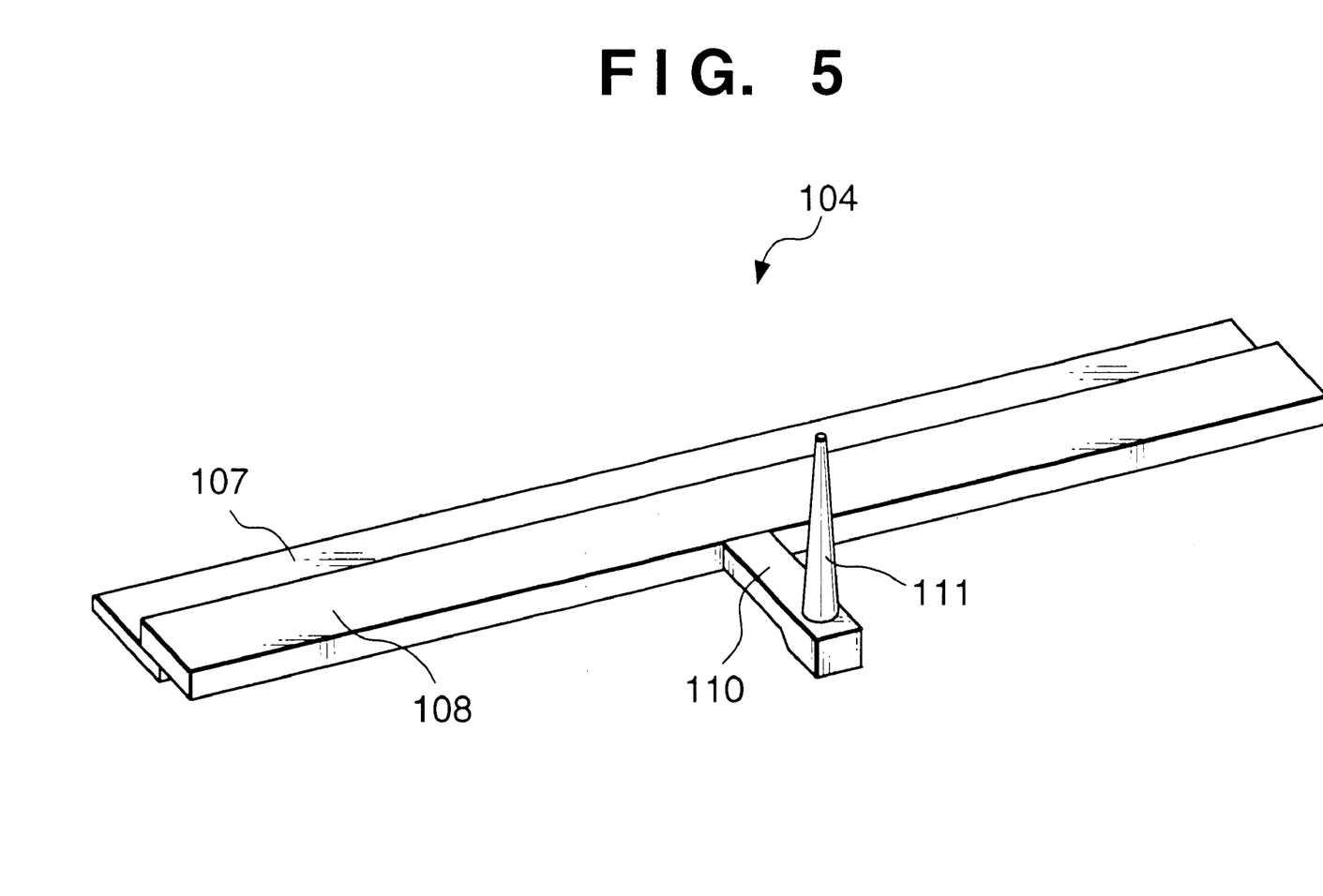
FIG. 5 is a perspective view showing a conventional developer regulating member having a gate.

In the developer regulating member 104 in this conventional injection molding, a gate 110 for resin injection is formed at substantially the center of the long-side end face of the elastic blade 107, as shown in FIG. 5, and a runner 111 is so formed as to continue to the gate 110. This runner 111 is a cold runner. The elastic blade 107 to be formed by charging the resin has a thin, elongated shape with a thickness of approximately 1 mm and a length of approximately 200 mm or more. The runner 111 minimizes the length of a resin flow path, thereby eliminating defective charging. If the runner 111 is a hot runner, a portion near the gate 110 thermally shrinks greatly due to the heat of the hot runner. Also, since the gate 110 is located on the long-side end face, its heat shrinkage degrades the flatness of the elastic blade 107.

Figure 6:
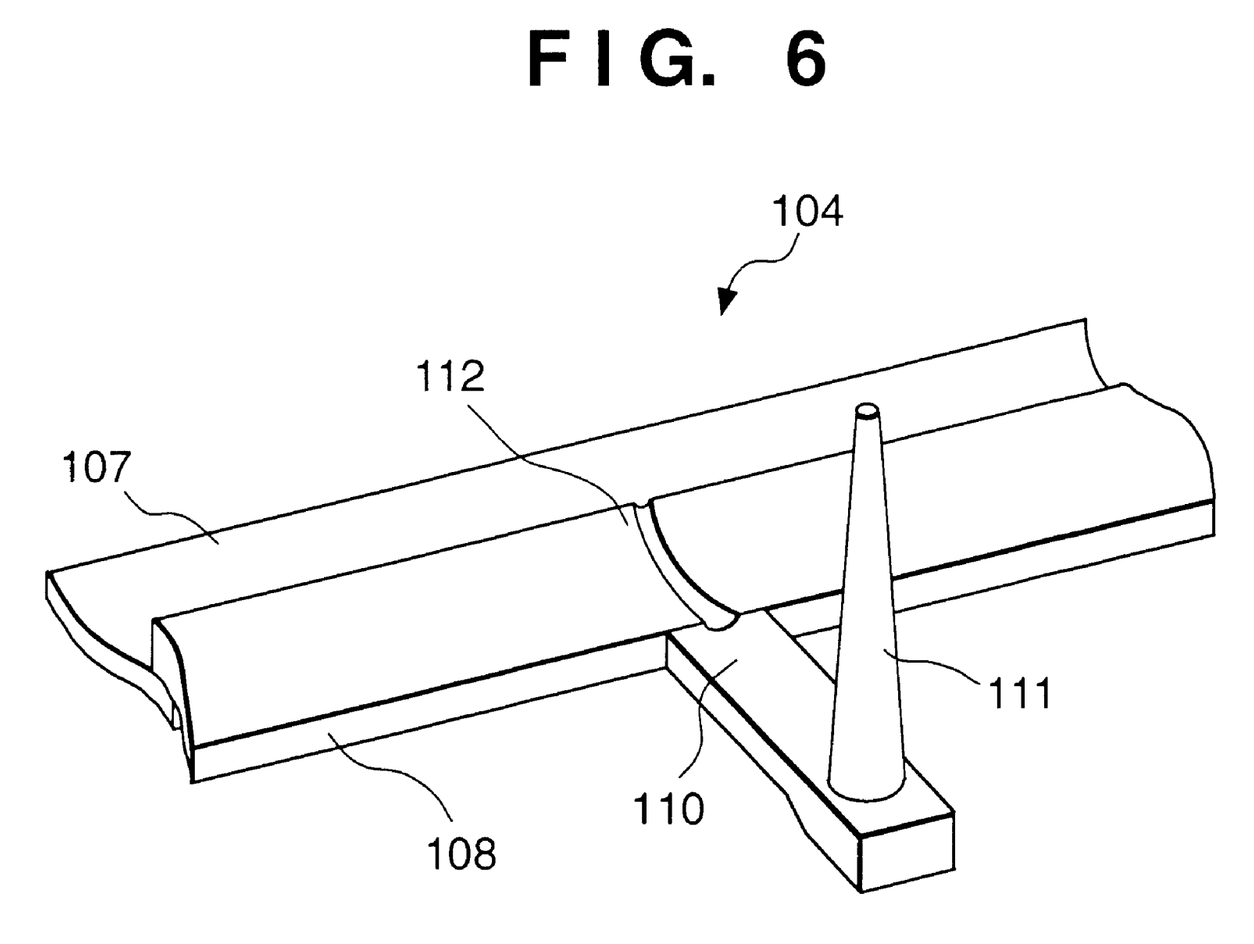
FIG. 6 is a perspective view, similar to FIG. 5, showing distortion in the elastic blade of the conventional developer regulating member having a gate.

The metal thin plate (e.g., phosphor bronze; $1.8 \times 10^{-6}/° C.$) and thermoplastic elastomer (e.g., polyamide-containing elastomer diamide PAE E40[manufactured by DAICEL-HULS]; $1.5 \times 10^{-4}/° C.$) that form the developer regulating member 104 have largely different coefficients of linear expansion. Therefore, when the thermoplastic elastomer is injected into a mold, in which the metal thin plate 108 coated with a primer is mounted and arranged in advance, to integrally mold the elastic blade 107, since shrinkage of the thermoplastic elastomer during cooling solidification is much larger than that of the metal thin plate 108, the thermoplastic elastomer on the metal thin plate 108 is fixed to the metal thin plate 108 with the primer, as shown in FIG. 6, and distortion during molding remains near the gate 110. Distortion 112 accordingly occurs between the metal thin plate 108 and gate 110 in a direction perpendicular to the long side of the elastic blade 107. This appears as a streaking nonuniformity in the coating on the developing sleeve 103 produced by partial defective urging.

Figure 7:
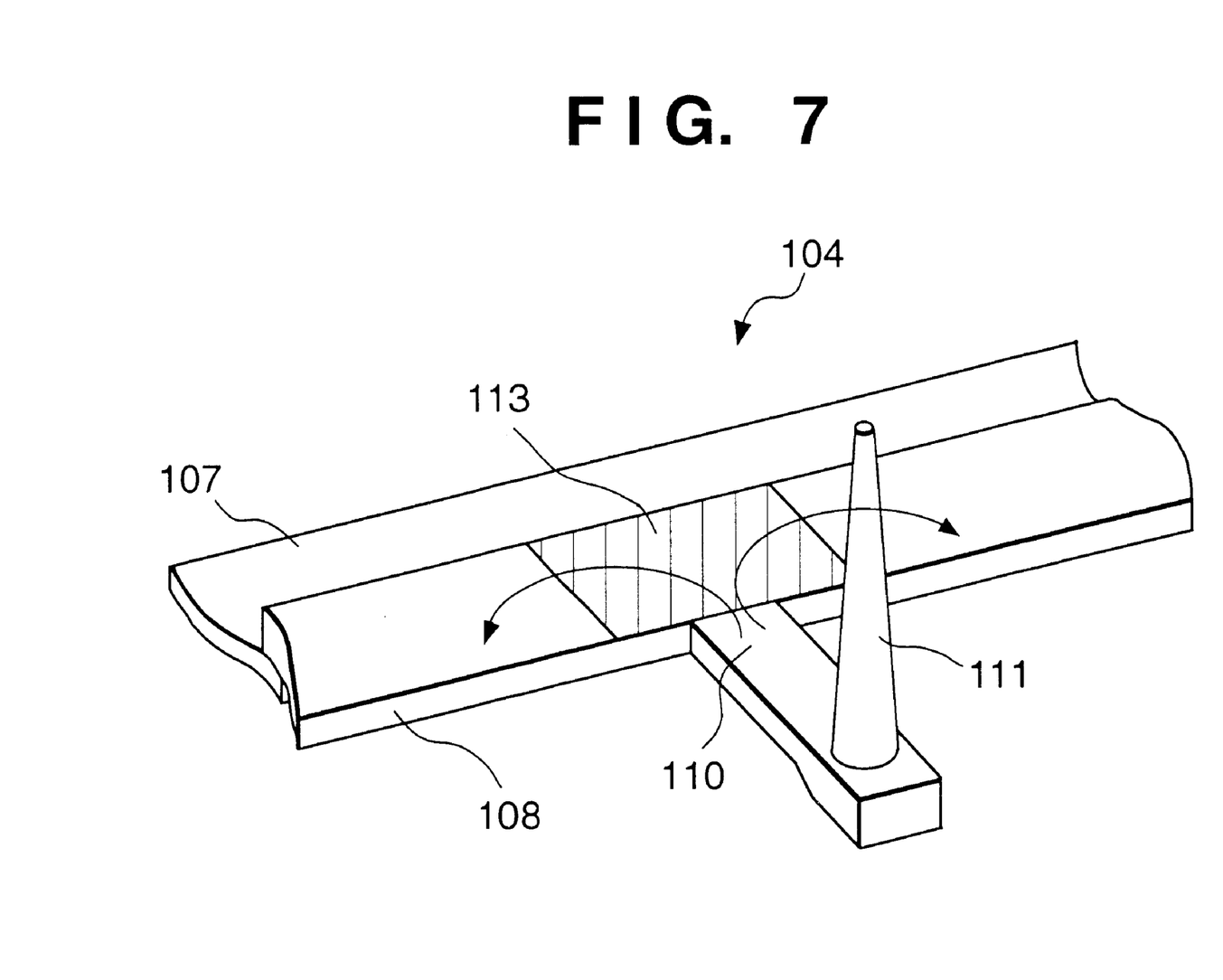
FIG. 7 is a perspective view showing the flow of a resin on the elastic blade of the conventional developer regulating member having a gate.

As shown in FIG. 7, the resin flow changes its flowing direction after it abuts against the long side of the elastic blade 107 on the metal thin plate 108 side. As a result, a flow mark 113 is formed in the hatched portion in FIG. 7 on the surface of the elastic blade 107.

SUMMARY OF THE INVENTION

The present invention has been made to solve the above problems, and has as its object to provide a method of molding a developer regulating member having an elastic blade with a high flatness and small surface roughness, and a developer regulating member which uniformly charges toner by friction and which does not form partial streaking nonuniformity in a uniform thin layer on a developing sleeve.

In order to achieve the above object, according to the present invention, there is provided a developer regulating member obtained by integrally forming a metal thin plate with spring elasticity and an elastic blade by injection molding or injection compression molding, characterized in that a resin injection gate for the elastic blade is formed on a short-side end face of the elastic blade.

The developer regulating member according to the present invention is characterized in that a sacrificial gate is formed on a short-side end portion, opposite to the resin injection gate, of the elastic blade.

The developer regulating member according to the present invention is characterized in that the sacrificial gate has a length of not less than 1 mm.

The developer regulating member according to the present invention is characterized in that the elastic blade is made of a thermoplastic elastomer.

The developer regulating member according to the present invention is characterized in that the thermoplastic elastomer is a material selected from the group consisting of styrene-, olefin-, PVC-, urethane-, and polyamide-based elastomers.

The developer regulating member according to the present invention is characterized in that the resin injection gate is a tab gate, and a hot runner gate is formed on the tab gate.

The developer regulating member according to the present invention is characterized in that the resin injection gate is a tab gate, a subtab gate is formed on the tab gate, and a hot runner gate is formed on the subtab gate.

A method of molding a developer regulating member according to the present invention is characterized by comprising the steps of arranging a metal thin plate with spring elasticity adjacent to a cavity, for an elastic blade, in a mold, and injecting a thermoplastic elastomer from an injection sprue for the mold through a hot runner gate and a tab gate.

A method of molding a developer regulating member according to the present invention is characterized by comprising the steps of arranging a metal thin plate with spring elasticity adjacent to a cavity, for an elastic blade, in a mold, and injecting a thermoplastic elastomer from an injection sprue for the mold through a subtab gate, a hot runner gate, and a tab gate.

A method of molding a developer regulating member according to the present invention is characterized by further comprising, in addition to the step of arranging the metal thin plate in the cavity of the mold and injecting the thermoplastic elastomer, the step of compressing a surface of the elastic blade.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

According to a developer regulating member of the present invention and a method of molding the same, in a developer regulating member obtained by integrally forming a metal thin plate with spring elasticity and an elastic blade by injection molding or injection compression molding, a resin injection gate for the elastic blade is formed on a short-side end face of the elastic blade, a sacrificial gate is formed on a short-side end portion, opposite to the resin injection gate, of the elastic blade, the elastic blade is made of a thermoplastic elastomer, the resin injection gate is a tab gate, a hot runner gate is formed on the tab gate or on a subtab gate formed on the tab gate, and the method comprises the steps of arranging a metal thin plate with spring elasticity adjacent to a cavity, for an elastic blade, in a mold, injecting a thermoplastic elastomer from an injection sprue for the mold through a subtab gate, a hot runner gate, and tab gate, and compressing a surface of the elastic blade. Therefore, the developer regulating member can be integrally molded with a simple means without causing defective charging of a resin such as a thermoplastic elastomer. Molding can be performed well without distorting the surface of the elastic blade due to a distortion near the gate or defective flow (flow mark), or without degrading the surface roughness.

The developer regulating member and a method of molding the same according to the present invention will be described in detail with reference to FIGS. 1 to 4.

Figure 1:
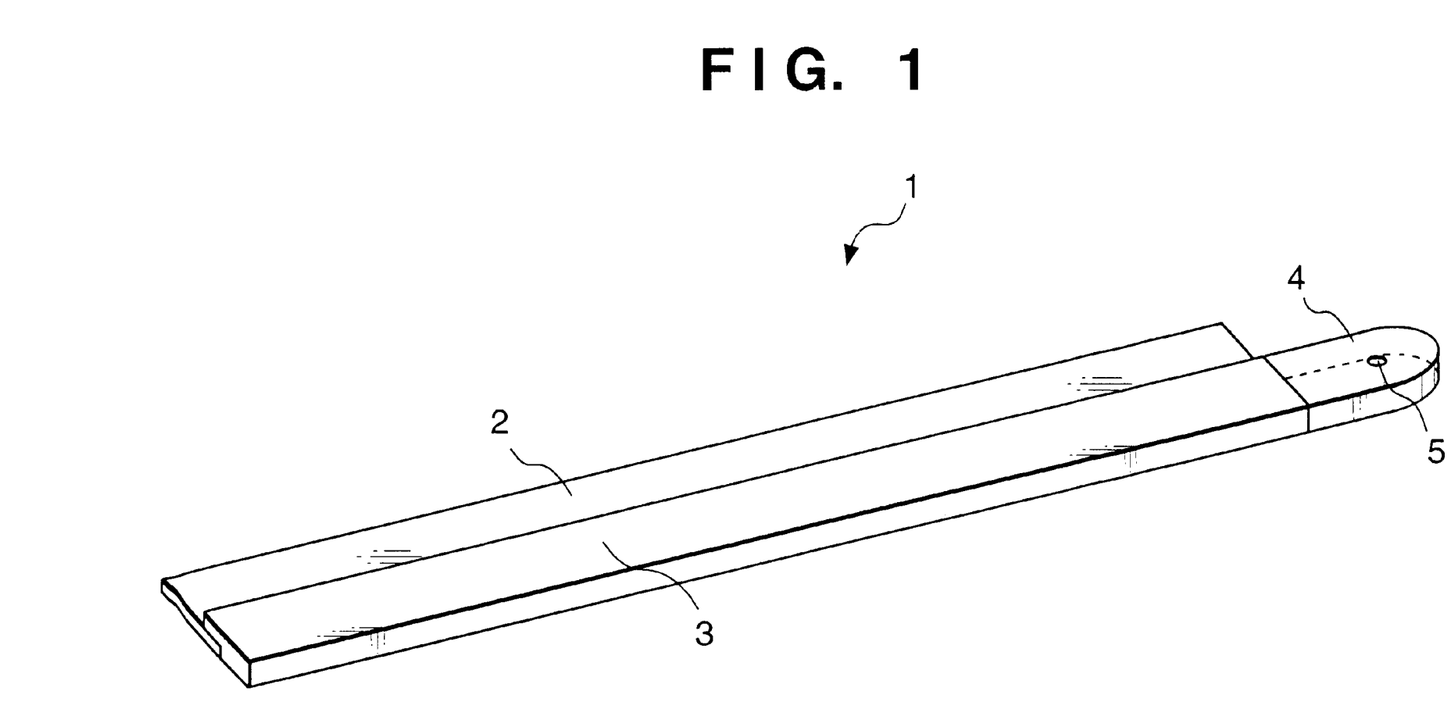
FIG. 1 is a perspective view of a developer regulating member according to the first embodiment of the present invention.
Figure 2:
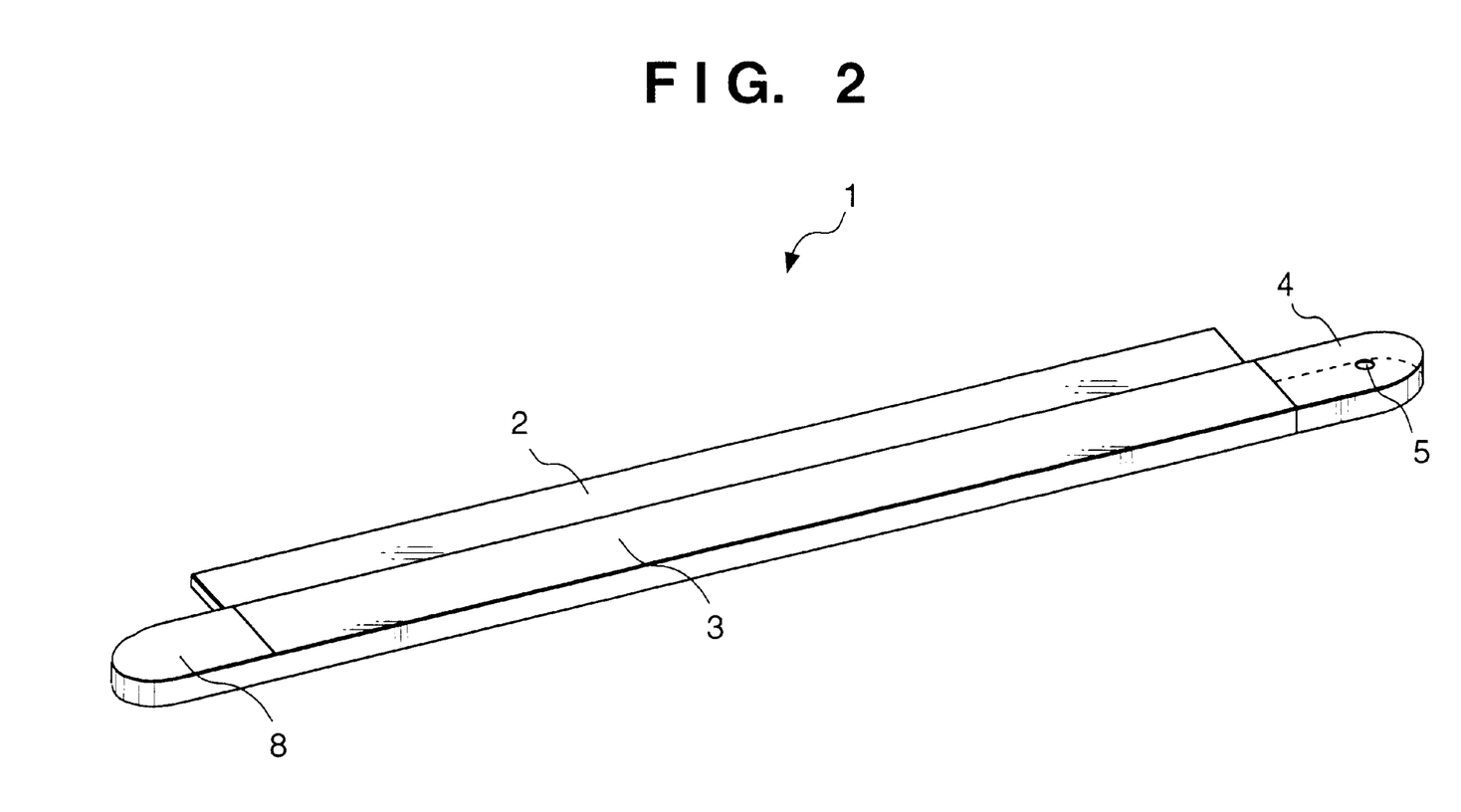
FIG. 2 is a view showing a modification of the developer regulating member of the first embodiment of the present invention.
Figure 3:
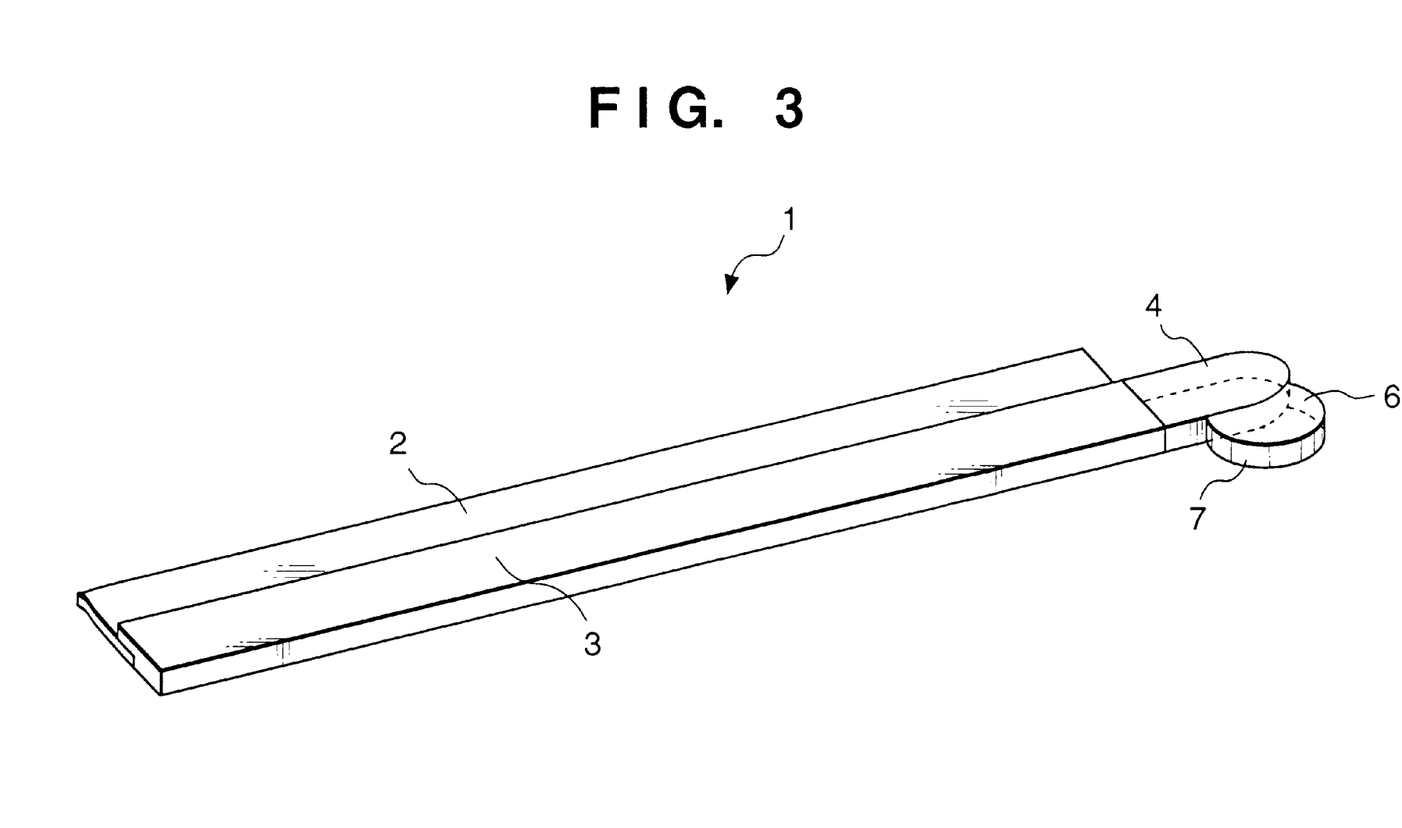
FIG. 3 is a view of a developer regulating member according to the second embodiment of the present invention.
Figure 4:
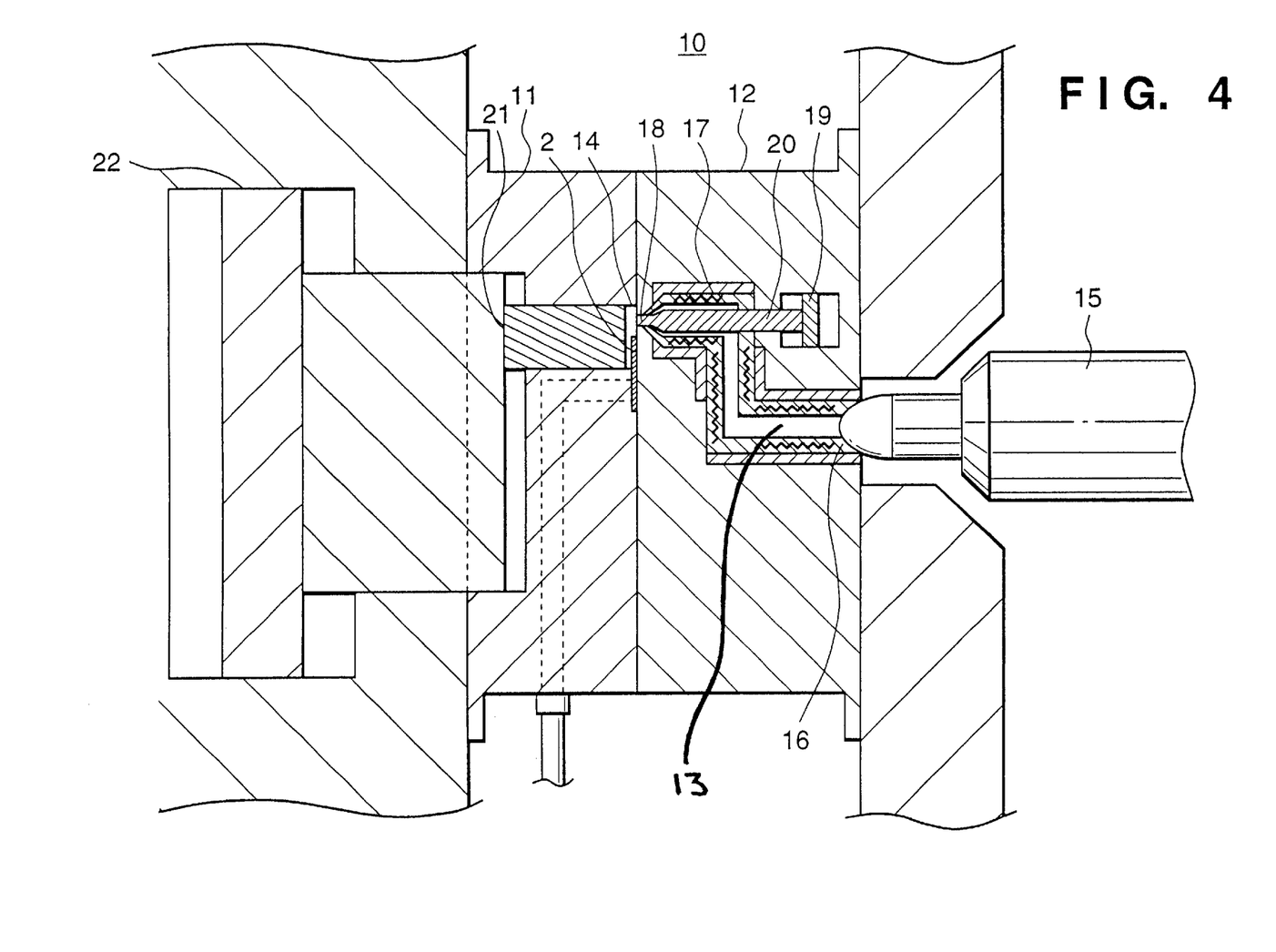
FIG. 4 is a sectional view of a molding apparatus for practicing a molding method of molding a developer regulating member according to the present invention.

FIGS. 1 to 4 show developer regulating members and a method of molding the same according to the first and second embodiments of the present invention. FIG. 1 is a perspective view showing the schematic arrangement of the developer regulating member according to the first embodiment formed by the molding method of the present invention. FIG. 2 is a perspective view, similar to FIG. 1, showing a modification of the embodiment of FIG. 1. FIG. 3 is a perspective view showing the schematic arrangement of the developer regulating member according to the second embodiment formed by the molding method of the present invention. FIG. 4 is a sectional view showing an injection mold for practicing the molding method of molding the developer regulating member of the present invention.

First Embodiment

As shown in FIG. 1, a developer regulating member 1 according to the first embodiment of the present invention is obtained by integrally forming a metal thin plate 2 with spring elasticity and an elastic blade 3 by injection molding or injection compression molding.

For example, this developer regulating member 1 of the present invention is obtained by molding a thermoplastic elastomer as the elastic blade 3 on the phosphor bronze metal thin plate 2 with spring elasticity and a thickness of approximately 0.1 mm, with a molding apparatus shown in FIG. 3. The resin injection gate of the elastic blade is a tab gate 4 formed by extending the elastic blade 3. A hot runner gate 5 is formed on the tab gate 4.

According to the present invention, since the resin injection gate of the elastic blade 3 is formed on the short-side end face of the elastic blade 3, the resin flows smoothly to be parallel with the long side of the elastic blade 3. Distortion on the surface of the elastic blade 3 due to a distortion of the gate does not occur in a direction perpendicular to the long side. Therefore, no streaking nonuniformity is formed at all. Since no flow mark is formed on the surface of the elastic blade 3 at all, an elastic blade 3 with a small surface roughness can be obtained.

The resin injection gate is the tab gate 4, and the hot runner gate 5 is formed on the tab gate 4. Even if heat shrinkage occurs greatly near the gate 5 due to the heat of the hot runner, the tab gate 4 absorbs it, so the flatness of the elastic blade 3 does not degrade. If necessary, the tab gate 4 is cut off after molding.

The method of molding the developer regulating member according to the present invention comprises the steps of arranging a metal thin plate with spring elasticity adjacent to a cavity, for the elastic blade, in a mold, injecting a thermoplastic elastomer from an injection sprue for the mold through a subtab gate and/or a hot runner gate, and a tab gate. Therefore, with this molding method according to the present invention, the developer regulating member can be integrally molded with a simple means. Molding can be performed well without distorting the surface of the elastic blade due to distortion near the gate or defective flow (flow mark), or without degrading the surface roughness.

According to a modification of the first embodiment, as shown in FIG. 2, a sacrificial gate 8 is further formed on the short-side end face, opposite to the resin injection gate, of an elastic blade 3. Degradation in surface roughness caused by gas burning at the flow end of the resin does not affect the surface of the elastic blade 3. During injection molding or injection compression molding, the resin flows into the sacrificial gate 8. Hence, the flowing state of the resin is very similar at two end faces of the elastic blade 3, and accordingly the flatness (warp) becomes almost the same at the two ends of the elastic blade 3. If necessary, the sacrificial gate 8 is cut off after molding. The length of the sacrificial gate 8 is 1 mm or more, and is preferably equal to the length of the tab gate 4.

Second Embodiment

FIG. 3 is a perspective view showing a developer regulating member 1 according to the second embodiment of the present invention. The developer regulating member 1 is obtained by integrally forming a metal thin plate 2 with spring elasticity and an elastic blade 3 by injection molding or injection compression molding.

As shown in FIG. 3, the resin injection gate of the elastic blade 3 is a tab gate 4 obtained by extending the elastic blade 3. A subtab gate 6 is further formed on the tab gate 4, and a hot runner gate 7 is formed on the subtab gate 6. If the hot runner gate 7 is formed on the subrunner, the tab gate 4 thermally shrinks greatly due to the heat of the hot runner. When the developer regulating member 1 is to be cut after molding at a position indicated by a broken line in FIG. 3, the tab gate 4 portion cannot be held due to this deformation, and a cutter fails to cut it.

According to the second embodiment shown in FIG. 3, although the subtab gate 6 thermally shrinks greatly due to the heat of the hot runner, this deformation does not reach the sub runner. Hence, during cutting, the cutter does not fail to cause defective cutting.

FIG. 4 is a sectional view of a molding apparatus which practices the molding method of the present invention so that the developer regulating member shown in FIGS. 1 to 3 is manufactured.

As shown in FIG. 4, an injection mold 10 for practicing the molding method of the present invention is comprised of a movable mold 11 and stationary mold 12. A cavity 14 for a developer regulating member to be molded is formed between the movable and stationary molds 11 and 12. A metal thin plate 2 is mounted in the cavity 14 in advance.

In this injection mold 10, a molten thermoplastic 20 elastomer is injected by an injection cylinder 15 from a nozzle 17 into the cavity 14, in which the metal thin plate 2 has been mounted in advance, between the movable and stationary molds 11 and 12, through a manifold 16 of the hot runner and a sprue 13. A valve pin 20 is driven by an opening/closing cylinder 19 in order that a valve gate 18 of the nozzle 17 can be opened or closed. Appropriate heating elements are buried in the manifold 16 and nozzle 17 to prevent solidification of the resin.

A compression core 21 for compressing the surface f an elastic blade 3 is initially moved back so that the elastic blade 3 becomes thicker than a predetermined thickness, and is driven by a compression cylinder 22 to move forward until the elastic blade 3 has the predetermined thickness. Accordingly, when injecting the resin to form the elastic blade 3, as the compression core 21 which can press the surface of the elastic blade 3 has been moved backward so that the elastic blade 3 becomes thicker than the predetermined thickness, the flow resistance is decreased, and an injection pressure necessary for forming the elastic blade 3 by charging can be decreased. Therefore, defective charging does not occur.

Molding is not limited to injection compression molding, but injection molding can be performed instead as far as a molding machine can perform high-speed injection molding at an injection rate corresponding to a screw moving speed of 100 mm/sec or more. The hot runner gate is not limited to the valve gate 18, but an intermittent heating method may be employed instead.

As the thermoplastic elastomer, various types of thermoplastic elastomers such as styrene-, olefin-, PVC-, urethane-, or polyester-based elastomer can be used. As the elastic blade 3 of the developer regulating member, a polyamide-based elastomer can be suitably used.

In the present invention having the above-described arrangement, the resin flows smoothly to be parallel with the long side of the elastic blade. Distortion on the surface of the elastic blade 3 due to distortion of the gate does not occur in a direction perpendicular to the long side. Therefore, no streaking nonuniformity is formed. Since no flow mark is formed on the surface of the elastic blade, an elastic blade with a small surface roughness and high flatness can be provided, and stable development can be obtained. Since the developer regulating member can be molded by an injection molding machine, it can be manufactured at a low cost.

In the developer regulating member having the above arrangement according to the present invention, in the developer regulating member obtained by integrally forming a metal thin plate with spring elasticity and an elastic blade by injection molding or injection compression molding, a resin injection gate for the elastic blade is formed on a short-side end face of the elastic blade. Molding can be performed well without distorting the surface of the elastic blade due to distortion near the gate or defective flow (flow mark), or without degrading the surface roughness. As a result, a good developer regulating member can be formed and fabricated easily without any streaking nonuniformity.

In the developer regulating member according to the present invention, a sacrificial gate is formed on a short-side end portion, opposite to the resin injection gate, of the elastic blade. Degradation in surface roughness caused by gas burning at the flow end of the resin does not affect the surface of the elastic blade. During injection molding or injection compression molding, the resin flows into the sacrificial gate. Hence, the flowing state of the resin is very similar at two end faces of the elastic blade, and accordingly the flatness (warp) becomes almost the same at the two ends of the elastic blade.

In the developer regulating member according to the present invention, since the length of the sacrificial gate is 1 mm or more, the resin flows into the sacrificial gate. Since the flowing state of the resin is very similar at two end faces of the elastic blade, the flatness (warp) becomes almost the same at the two end faces of the elastic blade.

The developer regulating member according to the present invention can be fabricated in mass production at a low cost, since the elastic blade is made of a thermoplastic elastomer.

The developer regulating member according to the resent invention can be manufactured with an inexpensive material in mass production, since the thermoplastic elastomer is a styrene-, olefin-, PVC-, urethane-, or polyamide-based elastomer.

The developer regulating member according to the present invention can be fabricated well to have a simple arrangement without distorting the surface of the elastic blade due to distortion near the gate or defective flow that causes a flow mark, or without degrading the surface roughness, because the resin injection gate is a tab gate, and a hot runner gate is formed on the tab gate.

The developer regulating member according to the present invention can be fabricated well to have a simple arrangement without distorting the surface of the elastic blade due to distortion near the gate or defective flow (flow mark), or without degrading the surface roughness, because the resin injection gate is a tab gate, a subtab gate is formed on the tab gate, and a hot runner gate is formed on the subtab gate.

The method of molding the developer regulating member according to the present invention comprises the steps of arranging a metal thin plate with spring elasticity adjacent to a cavity, for an elastic blade, in a mold, and injecting a thermoplastic elastomer from an injection sprue for the mold through a hot runner gate and a tab gate. Therefore, the developer regulating member can be molded integrally with a simple means. Molding can be performed well without distorting the surface of the elastic blade due to distortion near the gate or defective flow that causes a flow mark, or without degrading the surface roughness.

The method of molding the developer regulating member according to the present invention comprises the steps of arranging a metal thin plate with spring elasticity adjacent to a cavity, for an elastic blade, in a mold, and injecting a thermoplastic elastomer from an injection sprue for the mold through a subtab gate, a hot runner gate, and a tab gate. Therefore, the developer regulating member can be molded integrally with a simple means. Molding can be performed well without distorting the surface of the elastic blade due to distortion near the gate or defective flow that causes a flow mark, or without degrading the surface roughness.

The method of molding the developer regulating member according to the present invention comprises, in addition to the step of arranging the metal thin plate in the cavity of the mold and injecting the thermoplastic elastomer, the step of compressing the surface of the elastic blade. Therefore, defective charging of the thermoplastic elastomer does not occur.

The present invention is not limited to the above embodiments and various changes and modifications can be made within the spirit and scope of the present invention. Therefore, to apprise the public of the scope of the present invention the following claims are made.

What is claimed is:

1. A developer regulating member obtained by integrally forming a metal plate having spring elasticity and an elastic blade by one of injection molding and injection compression molding, wherein a resin injection gate is disposed on a first short side end face, and a sacrificial gate is disposed on a second short side end face, opposite to said resin injection gate, of said elastic blade, whereby a resin flow at each of said first and second short side end faces is substantially similar, and wherein said resin injection gate and said sacrificial gate are removed from said elastic blade after said elastic blade has been molded.

2. The member according to claim 1, wherein a length of said sacrificial gate is not less than 1 mm.

3. The member according to claim 1, wherein said elastic blade is made of a thermoplastic elastomer.

4. The member according to claim 3, wherein said thermoplastic elastomer is a material selected from the group consisting of styrene-, olefin-, PVC-, urethane-, and polyamide-based elastomers.

5. The member according to claim 1, wherein said resin injection gate is a tab gate, and a hot runner gate is formed on said tab gate.

6. The member according to claim 1, wherein said resin injection gate is a tab gate, a subtab gate is formed on said tab gate, and a hot runner gate is formed on said subtab gate.

* * * * *